United States Patent
Okada et al.

(10) Patent No.: US 12,551,878 B2
(45) Date of Patent: Feb. 17, 2026

(54) METHOD FOR MANUFACTURING EXHAUST GAS PURIFICATION CATALYST DEVICE

(71) Applicant: CATALER CORPORATION, Kakegawa (JP)

(72) Inventors: Hiroki Okada, Kakegawa (JP); Koji Oga, Kakegawa (JP); Kazuhiro Mizoguchi, Kakegawa (JP); Hitomi Suzuki, Kakegawa (JP); Yuji Kawarasaki, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 64 days.

(21) Appl. No.: 18/703,541

(22) PCT Filed: Nov. 14, 2022

(86) PCT No.: PCT/JP2022/042263
§ 371 (c)(1),
(2) Date: Apr. 22, 2024

(87) PCT Pub. No.: WO2023/090295
PCT Pub. Date: May 25, 2023

(65) Prior Publication Data
US 2024/0408589 A1    Dec. 12, 2024

(30) Foreign Application Priority Data
Nov. 22, 2021    (JP) .................. 2021-189145

(51) Int. Cl.
*B01J 37/02* (2006.01)
*B01D 53/94* (2006.01)
*B01J 35/57* (2024.01)

(52) U.S. Cl.
CPC .......... *B01J 37/0215* (2013.01); *B01D 53/94* (2013.01); *B01J 35/57* (2024.01)

(58) Field of Classification Search
CPC ....... B01J 35/37; B01J 37/0215; B01D 53/94; Y02A 50/20; B05D 3/0493; B05D 7/22; B05D 2254/00
(Continued)

(56) References Cited

U.S. PATENT DOCUMENTS 3,948,213 A * 4/1976 Hoyer ............... B01J 3/006
                                                    118/428
3,959,520 A * 5/1976 Hoyer ............... B01J 37/0215
                                                    118/712
(Continued)

FOREIGN PATENT DOCUMENTS

CN    113769988 A  * 12/2021  ............... B05C 7/04
JP    2003-237940 A    8/2003
(Continued)

OTHER PUBLICATIONS

Govender et al., Monoliths: A Review of the Basics, Preparation Methods and Their Relevance to Oxidation, Catalysts 2017, 7, 62. (Year: 2017).*
(Continued)

*Primary Examiner* — William P Fletcher, III
(74) *Attorney, Agent, or Firm* — Oliff PLC

(57) ABSTRACT

A method for manufacturing an exhaust gas purification catalyst device includes: (A) placing a catalyst coating layer-forming coating liquid on the upper end surface of a honeycomb substrate having a plurality of cell flow paths partitioned by cell walls in a coating liquid placing station; (B) transferring the substrate from the coating liquid placing station to a suction station; and (C) suctioning the substrate from the lower end surface in the suction station to coat the
(Continued)

cell walls of the substrate with the coating liquid, wherein the suction station comprises two or more suction devices, and step (B) comprises (B1) transferring the substrate, on which the coating liquid has been placed, from the coating liquid placing station to a branch station, and (B2) transferring the substrate, on which the coating liquid has been placed, to an empty suction device among the suction devices of the branch station.

7 Claims, 2 Drawing Sheets

(58) Field of Classification Search
USPC ......... 118/317, 401, 408; 427/235, 236, 238
See application file for complete search history.

(56) References Cited

U.S. PATENT DOCUMENTS

| | | | | |
|---|---|---|---|---|
| 4,550,034 | A * | 10/1985 | Shimrock | B01J 37/0215 |
| | | | | 502/514 |
| 4,609,563 | A * | 9/1986 | Shimrock | B01J 37/0215 |
| | | | | 502/514 |
| 5,165,970 | A * | 11/1992 | Schmidt | C04B 41/5031 |
| | | | | 427/247 |
| 5,866,210 | A * | 2/1999 | Rosynsky | C04B 41/009 |
| | | | | 427/430.1 |
| 5,953,832 | A * | 9/1999 | Rosynsky | B01J 37/0215 |
| | | | | 34/92 |
| 6,149,973 | A * | 11/2000 | Foerster | B01J 37/0215 |
| | | | | 427/443.2 |
| 6,548,105 | B2 * | 4/2003 | Kiessling | B01J 35/19 |
| | | | | 427/430.1 |
| 6,746,716 | B2 * | 6/2004 | Kiessling | C04B 41/81 |
| | | | | 427/430.1 |
| 7,374,792 | B2 * | 5/2008 | Rosynsky | B05D 3/042 |
| | | | | 427/372.2 |
| 7,476,417 | B2 * | 1/2009 | Dettling | C04B 41/4535 |
| | | | | 427/256 |
| 7,521,087 | B2 * | 4/2009 | Rosynsky | B01J 37/0215 |
| | | | | 427/372.2 |
| 7,678,416 | B2 * | 3/2010 | Suzuki | B01J 37/0215 |
| | | | | 427/230 |
| 8,703,236 | B2 * | 4/2014 | Chandler | B01J 27/224 |
| | | | | 427/238 |
| 9,488,087 | B2 * | 11/2016 | Mergner | B05C 3/109 |
| 9,551,253 | B2 * | 1/2017 | Fehnle | B01J 37/0215 |
| 9,849,469 | B2 * | 12/2017 | Nakano | B05C 5/0241 |
| 10,328,387 | B2 * | 6/2019 | Fukuyo | B05C 7/04 |
| 10,441,949 | B2 * | 10/2019 | Harris | B01J 37/0215 |
| 11,813,599 | B2 * | 11/2023 | Han | B01J 6/001 |
| 2014/0362190 | A1 | 12/2014 | Takagi | |
| 2018/0281011 | A1 * | 10/2018 | Gramiccioni | B05C 7/04 |
| 2021/0086133 | A1 * | 3/2021 | Kido | B01J 37/02 |

FOREIGN PATENT DOCUMENTS

| | | | | |
|---|---|---|---|---|
| JP | 2015-015704 A | | 1/2015 | |
| KR | 20250121337 A | * | 8/2025 | ............ F01N 3/035 |
| WO | WO-2011080525 A1 | * | 7/2011 | ............ B05C 9/04 |
| WO | WO-2016169590 A1 | * | 10/2016 | ............ B05D 7/22 |
| WO | WO-2017098355 A1 | * | 6/2017 | ............ B05D 1/18 |

OTHER PUBLICATIONS

Jan. 17, 2023 International Search Report issued in International Patent Application No. PCT/JP2022/042263.

Jan. 17, 2023 Written Opinion issued in International Patent Application No. PCT/JP2022/042263.

* cited by examiner

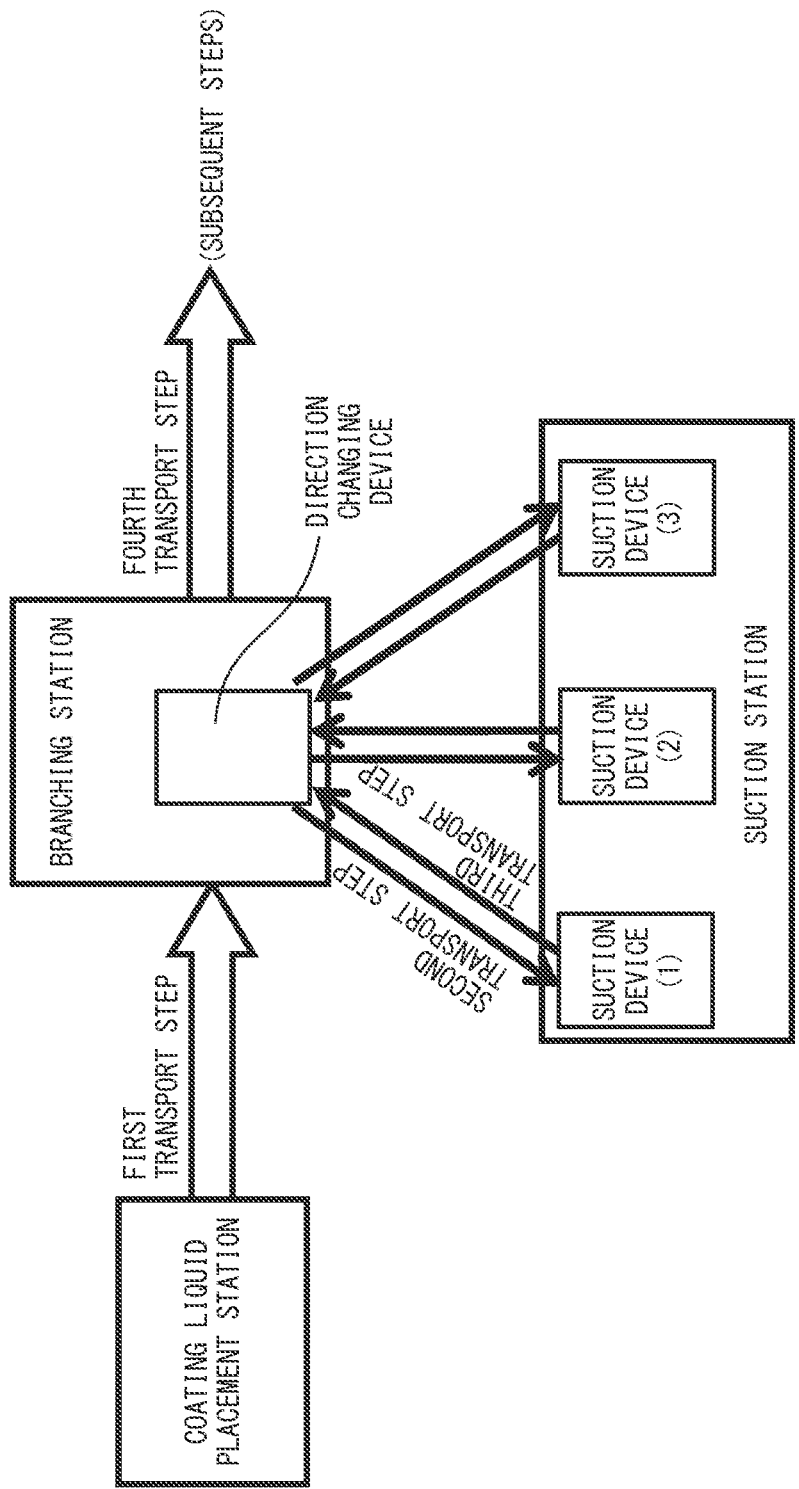

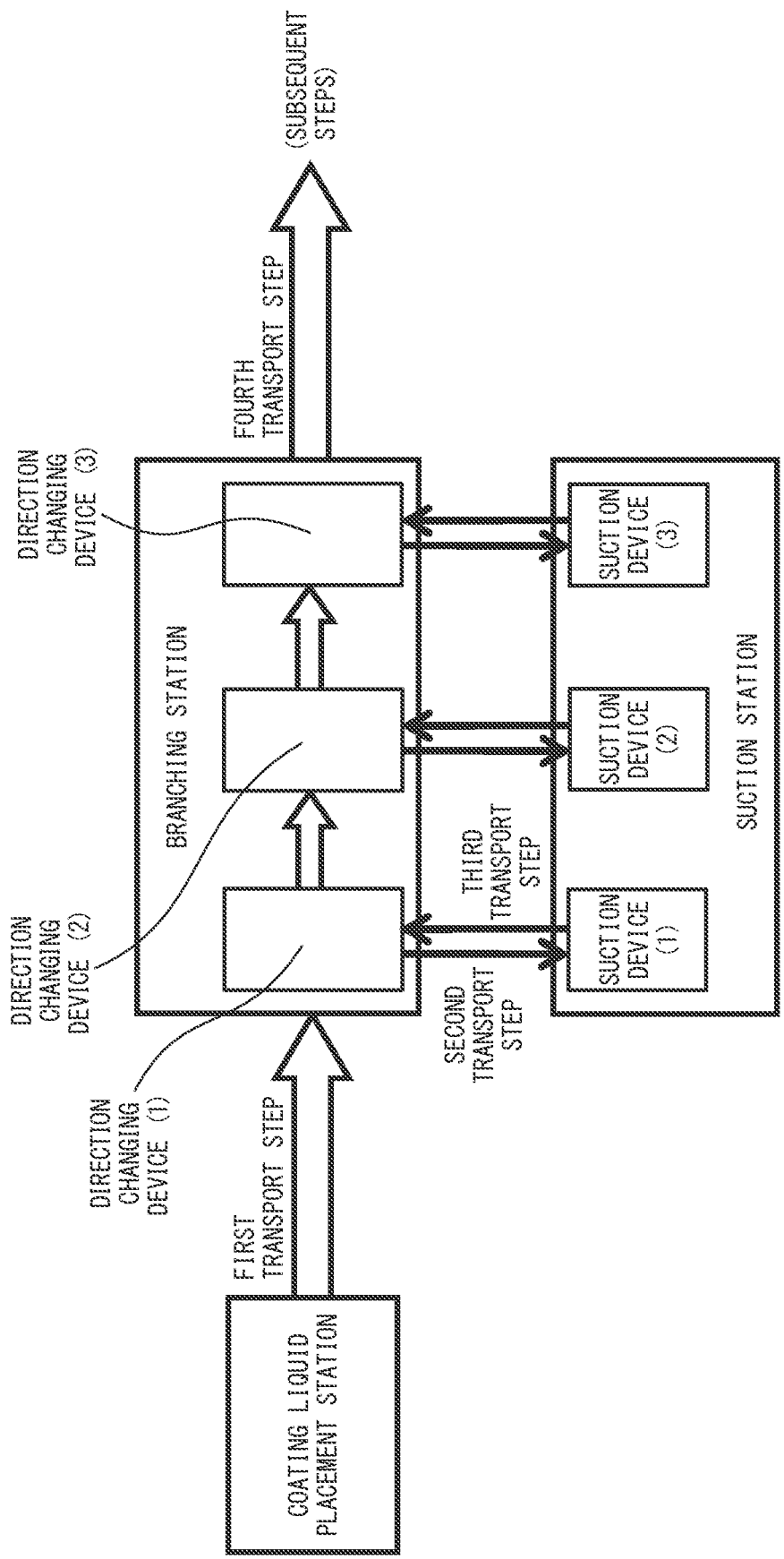

METHOD FOR MANUFACTURING EXHAUST GAS PURIFICATION CATALYST DEVICE

FIELD

The present invention relates to a method for manufacturing an exhaust gas purification catalyst device.

BACKGROUND

Exhaust gas emitted from internal combustion engines such as automobile engines is purified by an exhaust gas purification catalyst device installed in the exhaust system, and then released into the atmosphere. Such an exhaust gas purification catalyst device has a structure comprising, for example, a honeycomb substrate having a plurality of cell flow channels partitioned by partition walls, and a catalyst coating layer formed on and/or in the partition walls of the honeycomb substrate.

Such an exhaust gas purification catalyst device is manufactured by, for example, coating a honeycomb substrate with a coating liquid containing the raw material components of the catalyst coating layer, and then firing the coating liquid.

Coating of a honeycomb substrate with a coating liquid by a method in which the coating liquid is placed on one end surface of the honeycomb substrate and then suctioned from the opposite end surface is known. For example, Patent Literature 1 describes coating a honeycomb substrate with a coating liquid by attaching a frame-shaped storage jig, which is capable of retaining the coating liquid, to a first end surface of the honeycomb substrate, placing the coating liquid on the first end surface, and relatively reducing the pressure on a second end surface side opposite to the first end surface as compared to the pressure on the first end surface side to cause the coating liquid to flow from the first end surface to the second end surface.

Industrial manufacturing of exhaust gas purification catalyst devices is typically performed by automated processing systems. In automatic processing systems, a plurality of processing stations are provided from the upstream side to the downstream side, and processing is performed sequentially.

In such an automatic processing system, the processing times of the processing stations do not necessarily match. In this case, among a series of processing stations provided from the upstream side to the downstream side, the processing at the processing station that requires the longest processing time becomes the rate-determining step of the entire process.

In such a case, it is conceivable to provide a plurality of rate-determining processing devices, arrange them side-by-side from the upstream side to the downstream side of the automatic processing system, and share the rate-determining process.

For example, Patent Literature 2 describes a conveyance device comprising a conveyance means for conveying a workpiece (processing object) along a conveyance line, and a processing means provided in the vicinity of this conveyance line, wherein an auxiliary overtaking means for grasping and lifting a preceding workpiece on the conveyance line is provided, whereby a trailing workpiece can overtake the preceding workpiece and be transported first.

CITATION LIST

Patent Literature

[PTL 1] Japanese Unexamined Patent Publication (Kokai) No. 2018-015704
[PTL 2] Japanese Unexamined Patent Publication (Kokai) No. 2003-237940

SUMMARY

Technical Problem

When coating a honeycomb substrate with a coating liquid by placing the coating liquid on one end of the honeycomb substrate and suctioning it from the opposite end, the suction process is often rate-limiting.

Specifically, in a coating method involving placing a coating liquid on an end surface of a honeycomb substrate and suctioning, the step of suctioning from the opposite end often takes a longer time than the step of placing the coating liquid on one end of the honeycomb substrate, and thus, the suction step often becomes the rate-limiting factor for coating of the coating liquid.

When applying the method described in Patent Literature 2 to the coating of a honeycomb substrate with a coating liquid where the suction step is rate-limiting, the time from placing the coating liquid to starting suction will vary depending on the honeycomb substrate, and the quality of the obtained coating layer will vary depending on the honeycomb substrate.

In place of the method described in Patent Literature 2, for a certain processing that requires a predetermined processing time, one workpiece is sequentially delivered to a plurality of processing devices, and short processes are divided amongst and performed by the processing devices, thereby ensuring a predetermined processing time for all of the plurality of processing devices.

However, when coating a honeycomb substrate with a coating liquid, if the suctioning after placing the coating liquid on the end surface is divided into parts and performed by the respective devices, the coating layer can be uneven, whereby there is a risk that the exhaust gas purification ability will be impaired.

The present invention has been conceived in view of the above circumstances, and an object thereof is to provide a highly-efficient method for manufacturing an exhaust gas purification catalyst device with which, when a honeycomb substrate is coated with a coating liquid by placing the coating liquid on one end surface of the honeycomb substrate and suctioning from the opposite end surface, it is possible to speed up the entire process while ensuring the specified suction time.

Solution to Problem

The present invention is as described below.
<<Aspect 1>>
A method for manufacturing an exhaust gas purification catalyst device, the method comprising the steps of:
(A) in a coating liquid placement station, holding a honeycomb substrate having a plurality of cell flow channels partitioned by cell walls so that a flow direction of the cell flow channels is vertical, and placing a catalyst layer formation coating liquid on an upper end surface of the substrate, (B) transporting the substrate after the coating liquid placement from the coating liquid placement station to a suction station;
(C) in the suction station, suctioning the substrate after the coating liquid placement from a lower end surface, to coat one or both of on the cell walls and in the cell walls of the substrate with the coating liquid, and
(D) removing the substrate after the coating liquid coating from the suction station and transporting it to a subsequent step,
a time of the step (C) for suctioning the substrate from the lower end surface after the coating liquid placement being longer than a time of the step (A) for placing the catalyst layer formation coating liquid on the upper end surface of the substrate, wherein
the suction station comprises two or more suction devices, the step (B) includes:
(B1) transporting the substrate after the coating liquid placement from the coating liquid placement station to a branching station, and
(B2) transporting the substrate after the coating liquid placement from the branching station to the suction station, and
in the step (B2), the substrate after the coating liquid placement is transported to any vacant suction device of the two or more suction devices of the suction station.

<<Aspect 2>>

The method for manufacturing an exhaust gas purification catalyst device according to Aspect 1, wherein the steps (A) to (D) are carried out such that a time from an end time of the step (A) to a start time of the step (C) is within a predetermined range.

<<Aspect 3>>

The method for manufacturing an exhaust gas purification catalyst device according to Aspect 2, wherein in the step (A), placement of the catalyst layer formation coating liquid on the upper end surface of the substrate is performed after waiting for a predetermined time.

<<Aspect 4>>

The method for manufacturing an exhaust gas purification catalyst device according to any one of Aspects 1 to 3, wherein the step (D) comprises:
(D1) removing the substrate after the coating liquid coating from the suction station and transporting it to the branching station, and
(D2) transporting the substrate after the coating liquid coating from the branching station to a subsequent step.

<<Aspect 5>>

The method for manufacturing an exhaust gas purification catalyst device according to any one of Aspects 1 to 4, wherein the number of the suction devices included in the suction station is 3 or more and 6 or fewer.

<<Aspect 6>>

A manufacturing device for an exhaust gas purification catalyst device, comprising:
a coating liquid placement station for holding a honeycomb substrate having a plurality of cell flow channels partitioned by cell walls so that a flow direction of the cell flow channels is vertical, and placing a catalyst layer formation coating liquid on an upper end surface of the substrate,
a suction station having two or more suction devices for suctioning the substrate after the coating liquid placement from a lower end surface to coat one or both of on the cell walls and in the cell walls of the substrate with the coating liquid, and
a branching station for sending the substrate after the coating liquid placement to any of the two or more suction devices included in the suction station.

Advantageous Effects of Invention

According to the present invention, there is provided a method for manufacturing an exhaust gas purification catalyst device with which, when a honeycomb substrate is coated with a coating liquid by placing the coating liquid on one end surface of the honeycomb substrate and suctioning from the opposite end surface, it is possible to speed up the entire process while ensuring the specified suction time, and with which a high-quality coating layer can be obtained.

BRIEF DESCRIPTION OF DRAWINGS

FIG. 1 is a schematic view showing an overview of a method for manufacturing an exhaust gas purification catalyst device according to a first embodiment.
FIG. 2 is a schematic view showing an overview of a method for manufacturing an exhaust gas purification catalyst device according to a second embodiment.

DESCRIPTION OF EMBODIMENTS

The method for manufacturing an exhaust gas purification catalyst device of the present invention is directed to:
a method for manufacturing an exhaust gas purification catalyst device, the method comprising the steps of:
(A) in a coating liquid placement station, holding a honeycomb substrate having a plurality of cell flow channels partitioned by cell walls so that a flow direction of the cell flow channels is vertical, and placing a catalyst layer formation coating liquid on an upper end surface of the substrate,
(B) transporting the substrate after the coating liquid placement from the coating liquid placement station to a suction station;
(C) in the suction station, suctioning the substrate after the coating liquid placement from a lower end surface, to coat one or both of on the cell walls and in the cell walls of the substrate with the coating liquid, and
(D) removing the substrate after the coating liquid coating from the suction station and transporting it to a subsequent step,
a time of the step (C) for suctioning the substrate from the lower end surface after the coating liquid placement being longer than a time of the step (A) for placing the catalyst layer formation coating liquid on the upper end surface of the substrate, wherein
the suction station comprises two or more suction devices, the step (B) includes:
(B1) transporting the substrate after the coating liquid placement from the coating liquid placement station to a branching station, and
(B2) transporting the substrate after the coating liquid placement from the branching station to the suction station, and
in the step (B2), the substrate after the coating liquid placement is transported to any vacant suction device of the two or more suction devices of the suction station.

In the method of the present invention, the honeycomb substrate after coating liquid placement is transported to an empty suction device via a branching station. Thus, there is no congestion waiting for suction at a specific suction device. Therefore, the time from placing the coating liquid on the honeycomb substrate to the start of suction can be easily controlled to a predetermined time.

In the method of the present invention, the suction step for one honeycomb substrate is carried out with one suction device without interruption. Thus, unevenness is unlikely to occur in the obtained coating layer, whereby a high-quality coating layer can be obtained.

Each element in the method for manufacturing an exhaust gas purification catalyst device of the present invention will be described in order below. Below, first, the substrate, coating liquid placement station, suction station, and branching station will be described, and then each step constituting the method for manufacturing an exhaust gas purification catalyst device of the present invention will be described.

<Substrate>

The substrate applied to the method for manufacturing an exhaust gas purification catalyst device of the present invention is a honeycomb substrate having a plurality of cell flow channels partitioned by cell walls. The honeycomb substrate may be, for example, a straight-flow or wall-flow monolithic honeycomb substrate composed of a material such as cordierite, SiC, stainless steel, or inorganic oxide particles.

<Coating Liquid Placement Station>

The coating liquid placement station is a processing station for holding the honeycomb substrate having a plurality of cell flow channels partitioned by cell walls such that the flow direction of the cell flow channels is vertical, and placing a catalyst layer formation coating liquid on the upper end surface of the substrate.

The coating liquid placement station may comprise a coating device. This coating device may be, for example, a coating device which is capable of placing the coating liquid on the upper end surface of the honeycomb substrate being held so that the flow direction of the cell flow channels is vertical.

The coating device may comprise, for example, a frame-shaped placement jig and a coating liquid supply device.

The placement jig has, for example, a frame-like shape, and can be removably arranged at the upper end surface of the honeycomb substrate, and the upper end surface of the substrate and the placement jig may form a placement part for the coating liquid.

The coating liquid supply device may have, for example, a function for supplying and placing the coating liquid to the placement part described above. This coating liquid supply device may be, for example, a shower type or a spray type supply device.

<<Suction Station>>

The suction station is a processing station for suctioning the honeycomb substrate after coating liquid placement from the lower end surface and coating one or both of on the cell walls and in the cell walls of the substrate with the coating liquid.

Coating on the cell walls of the substrate with the coating liquid means coating in which a coating layer of the coating liquid is formed on the surfaces of the cell walls facing the cell flow channels. Coating in the cell walls of the substrate with the coating liquid means coating in which a coating layer of the coating liquid is formed on the surfaces of the pore walls of the porous cell walls.

The suction station comprises two or more suction devices. Each suction device may comprise at least a vacuum channel and a suction jig for connecting the vacuum channel with the lower end surface of the honeycomb substrate. The suction jig can be detachably attached to the lower end surface of the honeycomb substrate, and the pressure of the substrate to which the suction jig is attached is reduced near the lower ends of the cell flow channels.

As a result, a flow of air from the top to the bottom of the cell flow channels of the substrate is created, and as a result, the coating liquid placed on the upper end surface of the substrate flows into the cell flow channels, which are coated with the coating liquid to form a coating layer.

The vacuum channel of the suction device may be coupled to a vacuum generator, the vacuum channels of two or more suction devices may each be connected to a unique vacuum generator, or two or more vacuum channels may share one vacuum generator. Alternatively, two or more vacuum channels may be divided into several groups, and each group of vacuum channels may share one vacuum generator.

The vacuum generator may be, for example, a vacuum pump.

The number of suction devices included in the suction station may be two or more, three or more, or four or more. The number of suction devices may be eight or fewer or six or fewer. The number of suction devices included in a suction station is typically two or more and eight or fewer, or three or more and six or fewer.

<<Branching Station>>

The branching station has a function of receiving a honeycomb substrate on which the catalyst layer formation coating liquid has been placed on the upper end surface, which has been transported from the coating liquid placement station, and directing it toward one of the suction devices of the suction station.

In the branching station, for example, a direction changing device may be used to direct the honeycomb substrate received from the coating liquid placement station toward any of the suction devices of the suction station. The direction changing device may have a function for changing the traveling direction of the honeycomb substrate which has been transported from the coating liquid placement station toward the branching station so as to be directed from the branching station toward a specific suction device of the suction station.

The branching station may have only one multidirectional direction changing device which has a function for directing toward any of the suction devices among the two or more suction devices of the suction station, or may have the same number of unidirectional direction changing devices as the suction devices of the suction station, each having a function of directing only to a specific suction device. Alternatively, the two or more suction devices may be divided into several groups, and each group of suction devices may share one multidirectional direction changing device.

<<Method for Manufacturing Exhaust Gas Purification Catalyst Device>>

As described above, the method for manufacturing an exhaust gas purification catalyst device of the present invention is directed to:

a method for manufacturing an exhaust gas purification catalyst device, the method comprising the steps of:
(A) in a coating liquid placement station, holding a honeycomb substrate having a plurality of cell flow channels partitioned by cell walls so that a flow direction of the cell flow channels is vertical, and placing a catalyst layer formation coating liquid on an upper end surface of the substrate (coating liquid placement step),
(B) transporting the substrate after the coating liquid placement from the coating liquid placement station to a suction station (suction station loading step);

(C) in the suction station, suctioning the substrate after the coating liquid placement from a lower end surface, to coat one or both of on the cell walls and in the cell walls of the substrate with the coating liquid (suction coating step), and (D) removing the substrate after the coating liquid coating from the suction station and transporting it to a subsequent step (suction station discharge step), a time of the step (C) for suctioning the substrate from the lower end surface after the coating liquid placement being longer than a time of the step (A) for placing the catalyst layer formation coating liquid on the upper end surface of the substrate, wherein the suction station comprises two or more suction devices, the step (B) includes:

(B1) transporting the substrate after the coating liquid placement from the coating liquid placement station to a branching station (first transport step), and (B2) transporting the substrate after the coating liquid placement from the branching station to the suction station (second transport step), and in the step (B2), the substrate after the coating liquid placement is transported to any vacant suction device of the two or more suction devices of the suction station.

In the method for manufacturing an exhaust gas purification catalyst device of the present invention, the advantageous effects of the present invention are realized when the time of the (C) suction coating step for suctioning the substrate from the lower end surface after the coating liquid placement is longer than the time of the (A) coating liquid placement step for placing the catalyst layer formation coating liquid on the upper end surface of the substrate. In particular, the effects of the present invention are realized when the suction time of the (C) suction coating step is twice or more, three times or more, or four times or more longer than the coating liquid placement time of the (A) coating liquid placement step. The suction time in the (C) suction coating step may be 20 times or less or 15 times or less as compared to the coating liquid placement time of the (A) coating liquid placement step.

In the method for manufacturing an exhaust gas purification catalyst device of the present invention, the (B) suction station loading step comprises:

(B1) a first transport step of transporting the honeycomb substrate after the coating liquid placement from the coating liquid placement station to the branching station, and (B2) a second transport step of transporting the substrate after the coating liquid placement from the branching station to the suction station, wherein in the (B2) second transport step, the substrate after the coating liquid placement is transported to any vacant suction device among the two or more suction devices of the suction station.

In the method for manufacturing an exhaust gas purification catalyst device of the present invention, it is desirable that at least one of the two or more suction devices of the suction station be in an vacant state when the substrate reaches the branching station. In order to achieve this, it is desirable that the number of suction devices of the suction station be greater than the ratio (multiple) of the suction time in the (C) suction coating step to the coating liquid placement time in the (A) coating liquid placement step. For example, if the suction time is twice as long as the coating placement liquid time, it is desirable for the suction station to have two or more suction devices. If the suction time is 2.5 times the coating placement liquid time, it is desirable that the suction station have three or more suction devices.

However, in order to control the time from the placement of the coating liquid to the start of suctioning within a certain range and to suppress variations in the quality of the obtained coating layer, it is not necessarily an indispensable requirement that the suction station be equipped with the number of suction devices calculated based on the above criteria.

For example, in order to ensure that at least one of the two or more suction devices of the suction station is vacant when the substrate reaches the branching station, in the (A) coating liquid placement step, by placing the coating liquid on the upper end surface of the substrate after waiting for a predetermined time, the time from the placement of the coating liquid to the start of suctioning can be made constant.

In the method of the present invention, by:
making the number of suction devices in the suction station two or more,
providing the branching station between the coating liquid placement station and the suction station,
transporting the substrate after coating liquid placement to any vacant suction device of the two or more suction devices of the suction station, and
if necessary, placing the coating liquid on the upper end surface of the substrate in the (A) coating liquid placement step after waiting for a predetermined time,
the time from the placement of the coating liquid to the start of suction can be controlled within a certain range, whereby it is possible to speed up the entire process while suppressing variations in quality of the obtained coating layer.

In the method for manufacturing an exhaust gas purification catalyst device of the present invention, next, in the (D) suction station discharge step, the substrate coated with the coating liquid is discharged from the suction station and transported to a subsequent step.

At this time, the substrate coated with the coating liquid may be directly transported from the suction station to the subsequent step, or may be returned from the suction station to the branching station and then transported from the branching station to the subsequent step.

The (D) suction station discharge step in the case in which the substrate after coating liquid coating is returned from the suction station to the branching station and then transported from the branching station to a subsequent step may include:

(D1) a third transport step of removing the substrate coated with the coating liquid from the suction station and transporting it to the branching station, and (D2) a fourth transport step of transporting the substrate coated with the coating liquid from the branching station to a subsequent step.

According to the method for manufacturing an exhaust gas purification catalyst device of the present invention as described above, steps (A) to (D) can be performed so that the time from the end of the (A) coating liquid placement step to the start of the (C) suction coating step is within a predetermined range. According to the method of the present invention, the difference of the time from the end of the (A) coating liquid placement step to the start of the (C) suction coating step from a predetermined time set in advance can be set to within ±50%, within ±40%, within ±30%, within ±20%, within ±10%, within ±5%, within ±3%, within ±1%, within ±0.5%, within ±0.3%, or within ±0.1%.

The subsequent steps of the method for manufacturing an exhaust gas purification catalyst device of the present invention may be an arbitrary step such as, for example, a calcination step, a step of forming a second catalyst coating layer, a step of supporting a catalyst component, a conditioning step, or a casing loading step.

<<Manufacturing Device for Exhaust Gas Purification Catalyst Device>>

Another aspect of the present invention provides a manufacturing device for an exhaust gas purification catalyst device, comprising:

a coating liquid placement station for holding a honeycomb substrate having a plurality of cell flow channels partitioned by cell walls so that a flow direction of the cell flow channels is vertical, and placing a catalyst layer formation coating liquid on an upper end surface of the substrate, a suction station having two or more suction devices for suctioning the substrate after the coating liquid placement from a lower end surface to coat one or both of on the cell walls and in the cell walls of the substrate with the coating liquid, and a branching station for sending the substrate after the coating liquid placement to any of the two or more suction devices included in the suction station.

EMBODIMENTS

Manufacture of the exhaust gas purification catalyst device of the present invention will be described in detail by showing specific embodiments. However, the invention is not limited to the embodiments described below.

Embodiment 1

A schematic view detailing an overview of the method for manufacturing an exhaust gas purification catalyst device of Embodiment 1 is shown in FIG. 1.

The manufacturing method of FIG. 1 includes a coating liquid placement station, a branching station, and a suction station. The suction station has three suction devices (suction device (1), suction device (2), and suction device (3)), and the branching station has one direction changing device.

In the method shown in FIG. 1, the substrate after the coating liquid placement step in the coating liquid placement station is transported to the branching station in the first transport step. When the substrate is transported to the branching station, if the suction device (1) is free, the direction changing device changes the traveling direction of the substrate to the direction of the suction device (1), the substrate is transported to the suction device (1), and the (C) suction coating step is performed.

However, when the substrate reaches the direction changing device, if the (C) suction coating step is being performed on another substrate in the suction device (1), and the suction device (2) is empty, the direction changing device changes the traveling direction of the substrate to the direction of the suction device (2), the substrate is transported to the suction device (2), and the (C) suction coating step is performed.

Likewise, when the substrate is transported to the branching station, if (C) suction coating steps are being performed on other substrates in the suction device (1) and the suction device (2), the direction changing device changes the traveling direction of the substrate to the direction of the suction device (3), the substrate is transported to the suction device (3), and the (C) suction coating step is performed.

In the manufacturing method shown in FIG. 1, after the substrate, for which coating liquid coating has been performed by any of the suction devices (1) to (3), is transported to the direction changing device by the (D1) third transport step, it is transported to a subsequent step by the (D2) fourth transport step.

Thus, the direction changing device in the manufacturing method of Embodiment 1 has:

a function for directing the substrate transported from the coating liquid station toward the suction device (1), suction device (2), or suction device (3), and a function for directing the substrate transported from the suction device (1), suction device (2), or suction device (3) toward a subsequent step.

Embodiment 2

A schematic view detailing an overview of the method for manufacturing an exhaust gas purification catalyst device of Embodiment 2 is shown in FIG. 2.

The manufacturing method of FIG. 2 includes a coating liquid placement station, a branching station, and a suction station. The suction station has three suction devices (suction device (1), suction device (2), and suction device (3)), and the branching station has three direction changing devices (direction changing device (1), direction changing device (2), and direction changing device (3)), which is the same as the number of suction devices of the suction station.

The substrate after the coating liquid placement step at the coating liquid placement station is transported to the branching station by the first transport step. At the branching station, the substrate first reaches the direction changing device (1). At this time, if the suction device (1) is empty, the direction changing device (1) changes the traveling direction of the substrate to the direction of the suction device (1), the substrate is transported to the suction device (1), and the (C) suction coating step is performed.

However, when the substrate reaches the direction changing device (1), if the (C) suction coating step is being performed on another substrate in the suction device (1), the direction changing device (1) does not change the direction of travel of the substrate, and the substrate is transported to the direction changing device (2). At this time, if the suction device (2) is empty, the direction changing device (2) changes the traveling direction of the substrate to the direction of the suction device (2), the substrate is transported to the suction device (2), and the (C) suction coating step is performed.

Likewise, when the substrate reaches the direction changing device (2), if the (C) suction coating step is being performed on another substrate in the suction device (2), the direction changing device (2) does not change the direction of travel of the substrate, and the substrate is transported to the direction changing device (3). The direction changing device (3) changes the traveling direction of the substrate to the direction of the suction device (3), the substrate is transported to the suction device (3), and the (C) suction coating step is performed.

The substrate for which the coating liquid coating has been performed by the suction device (1) is transported to the direction changing device (1) by the third transport step (D1). This substrate is further transported to a subsequent step by the fourth transport step (D2) via the direction changing device (2) and the direction changing device (3).

The substrate for which the coating liquid coating has been performed by the suction device (2) is transported to the direction changing device (2) by the third transport step (D1). This substrate is further transported to a subsequent step by the fourth transport step (D2) via the direction changing device (3).

The substrate for which the coating liquid coating has been performed by the suction device (3) is transported to the direction changing device (3) by the third transport step (D1). This substrate is further transported to the subsequent step by the fourth transport step (D2).

Thus, in the manufacturing method of Embodiment 2, the direction changing device (1) has:
- a function for directing substrates transported from the coating liquid station towards the suction device (1) or the direction changing device (2), and
- a function for directing substrates transported from the suction device (1) towards the direction changing device (2), the direction changing device (2) has:
- a function for directing substrates transported from the coating liquid station via the direction changing device (1) towards the suction device (2) or the direction changing device (3), and
- a function for directing substrates transported from the suction device (2) towards the direction changing device (3), and the direction changing device (3) has:
- a function for directing substrates transported from the coating liquid station via the direction changing devices (1) and (2) toward the suction device (3), and
- a function for directing substrates transported from the suction device (3) to subsequent steps.

The invention claimed is:

1. A method for manufacturing an exhaust gas purification catalyst device, the method comprising the steps of:
   (A) in a coating liquid placement station, holding a honeycomb substrate having a plurality of cell flow channels partitioned by cell walls so that a flow direction of the cell flow channels is vertical, and placing a catalyst layer formation coating liquid on an upper end surface of the substrate,
   (B) transporting the substrate after the coating liquid placement from the coating liquid placement station to a suction station;
   (C) in the suction station, suctioning the substrate after the coating liquid placement from a lower end surface, to coat one or both of on the cell walls and in the cell walls of the substrate with the coating liquid, and
   (D) removing the substrate after the coating liquid coating from the suction station and transporting it to a subsequent step,
   a time of the step (C) for suctioning the substrate from the lower end surface after the coating liquid placement being longer than a time of the step (A) for placing the catalyst layer formation coating liquid on the upper end surface of the substrate, wherein
   the suction station comprises two or more suction devices, the step (B) comprises:
   (B1) transporting the substrate after the coating liquid placement from the coating liquid placement station to a branching station, and
   (B2) transporting the substrate from the branching station to the suction station,
   wherein, in the step (B2), the substrate is transported to any vacant suction device of the two or more suction devices.

2. The method for manufacturing an exhaust gas purification catalyst device according to claim 1, wherein the steps (A) to (D) are carried out such that a time from an end time of the step (A) to a start time of the step (C) is within a predetermined range.

3. The method for manufacturing an exhaust gas purification catalyst device according to claim 2, wherein in the step (A), placement of the catalyst layer formation coating liquid on the upper end surface of the substrate is performed after waiting for a predetermined time.

4. The method for manufacturing an exhaust gas purification catalyst device according to claim 1, wherein the step (D) comprises:
   (D1) removing the substrate after the coating liquid coating from the suction station and transporting it to the branching station, and
   (D2) transporting the substrate after the coating liquid coating from the branching station to the subsequent step.

5. The method for manufacturing an exhaust gas purification catalyst device according to claim 1, wherein the number of the suction devices included in the suction station is from 3 to 6.

6. A manufacturing device for an exhaust gas purification catalyst device, comprising:
   a coating liquid placement station for holding a honeycomb substrate having a plurality of cell flow channels partitioned by cell walls so that a flow direction of the cell flow channels is vertical, and placing a catalyst layer formation coating liquid on an upper end surface of the substrate,
   a suction station having two or more suction devices for suctioning the substrate after the coating liquid placement from a lower end surface to coat one or both of on the cell walls and in the cell walls of the substrate with the coating liquid, and
   a branching station for sending the substrate after the coating liquid placement to any of the two or more suction devices included in the suction station.

7. The manufacturing device for an exhaust gas purification catalyst device according to claim 6, wherein the number of the suction devices included in the suction station is from 3 to 6.

* * * * *